United States Patent [19]

Holbrook et al.

[11] Patent Number: 4,470,188
[45] Date of Patent: Sep. 11, 1984

[54] METHOD OF MECHANICALLY PRESTRESSING A TUBULAR APPARATUS

[75] Inventors: Richard L. Holbrook, Louisville; Dean L. Mayer, Alliance, both of Ohio

[73] Assignee: The Babcock & Wilcox Company, New Orleans, La.

[21] Appl. No.: 413,284

[22] Filed: Aug. 31, 1982

[51] Int. Cl.³ .................................................. B23P 9/00
[52] U.S. Cl. .......................................... 29/445; 29/446; 29/455 R; 29/516; 29/520; 138/148; 166/57
[58] Field of Search ........................ 29/446, 452, 455 R, 29/516, 520; 138/148; 166/57

[56] References Cited

U.S. PATENT DOCUMENTS

| | | | |
|---|---|---|---|
| 2,289,401 | 7/1942 | Yost | 138/148 |
| 2,693,026 | 11/1954 | Simpelaar | 29/516 UX |
| 2,828,537 | 4/1958 | Pischke et al. | 29/516 UX |
| 2,924,245 | 2/1960 | Wilson | 29/445 X |
| 3,149,513 | 9/1964 | Dollens | 29/516 X |
| 3,246,394 | 4/1966 | Meyer | 29/455 R X |
| 3,608,640 | 9/1971 | Wellhite | 166/57 X |
| 3,693,665 | 9/1972 | Veerling et al. | 29/446 X |
| 3,863,328 | 2/1975 | Arntz | 29/520 X |
| 4,125,924 | 11/1978 | Goetze | 29/516 X |
| 4,375,843 | 3/1983 | Itzinger et al. | 29/446 X |

*Primary Examiner*—Charlie T. Moon
*Attorney, Agent, or Firm*—Robert J. Edwards; James C. Simmons

[57] ABSTRACT

A method of prestressing a tubular apparatus having coaxial inner and outer tubes which are connected to each other at axially spaced locations comprises, after the inner and outer walls are connected to each other and the tube is heat-treated or otherwise processed, reducing the diameter of the outer wall so that the outer wall is elongated. The elongation of the outer wall establishes a prestressed condition between the inner and outer walls, with the inner wall under tension and the outer wall under compression. The reduction in diameter of the outer wall can be accomplished by using a roll extrusion machine, a tube reducer or a draw bench.

5 Claims, 5 Drawing Figures

U.S. Patent  Sep. 11, 1984  4,470,188
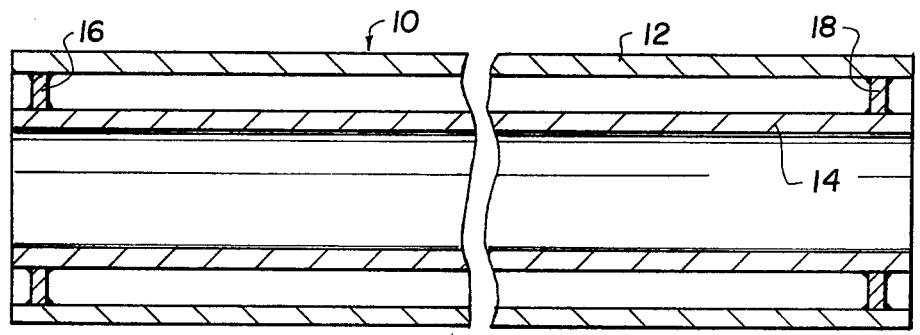
FIG. 1
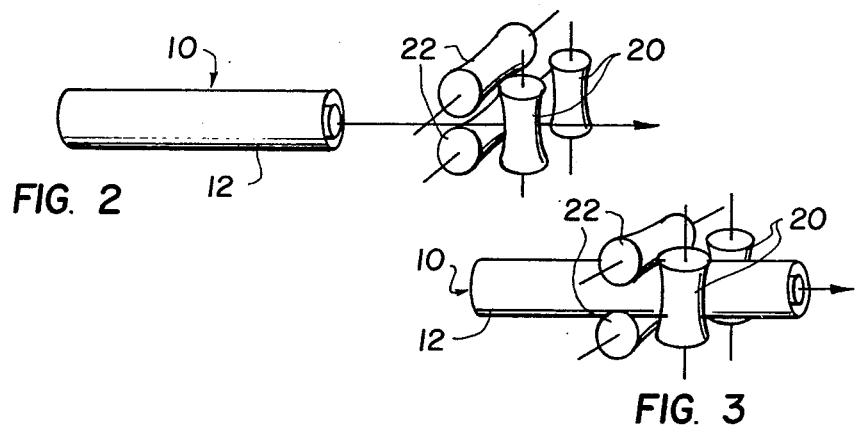
FIG. 2
FIG. 3
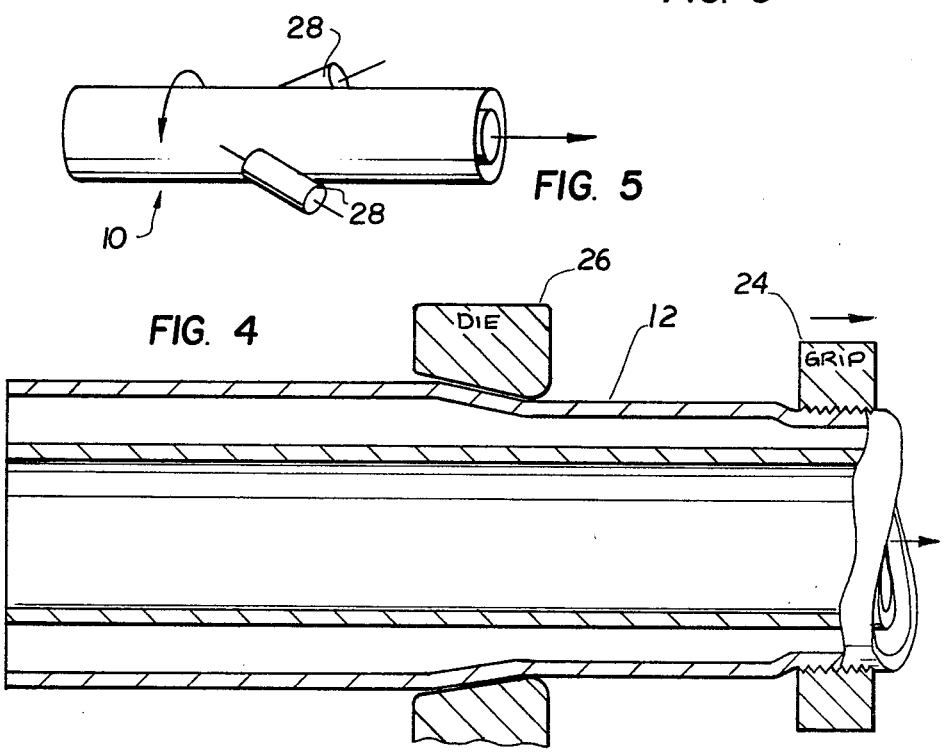
FIG. 5
FIG. 4

METHOD OF MECHANICALLY PRESTRESSING A TUBULAR APPARATUS

FIELD AND BACKGROUND OF THE INVENTION

The present invention relates, in general, to the prestressing of elongated conduits for conveying hot or cold fluid and in particular to a new and useful method of manufacturing and prestressing tubular apparatus having at least one inner tube and an outer tube.

Heavy oil and tar sands represent huge untapped resources of liquid hydrocarbons which will be produced in increasing quantities to help supplement declining production of conventional crude oil. These deposits must, however, be heated to reduce the oil viscosity before it will flow to the producing wells in economical quantities. The dominant method of heating is by injection of surface generated steam in either a continuous (steam flood) or intermittent (steam stimulation or "huff and puff") mode.

When steam is injected down long injection pipes or "strings," a significant amount of thermal energy is lost to the rock overburden (500 to 7000 feet) which covers the oil deposit. In the initial steam injection projects, the price of oil did not justify the prevention of this heat loss, but now with the price of oil at $30 or more a barrel, insulation systems for the well injection pipe become economically justified.

Thermally insulated tubular structures having at least one inner tube and an outer tube are known and used, for example, as insulated steam injection tubing in oil wells, or in pipe lines for carrying fluids at elevated temperatures. Such piping is disclosed, for example, in U.S. Pat. No. 3,574,357 to Alexandru et al and U.S. Pat. No. 3,397,745 to Owens et al.

It is common practice for such tubes to be prestressed in order to compensate for differential expansion of the inner and outer coaxial walls or tubes. Such prestressing is done, for example, by elongating the inner tube through such means as heating or mechanically stretching, and attaching the outer tube while the inner tube is in such a prestressed state. While still held in the prestressed state, any heat treatment required for the attachment is completed. After cool down from the heat treatment, the heating or mechanical stretching is removed and the tubes assume a state of tensile prestress on the inner tube and compressive prestress on the outer tube. While in service, the inner tube becomes hot and expands. This relaxes the tensile prestress before the inner tube goes into compression. In this manner, the inner tube is prevented from buckling.

In an analogous fashion, where the inner tube is adapted to convey cold fluids, the outer tube is heated or mechanically stretched before the inner tube is connected thereto.

Disadvantages of these prior approaches to prestressing double walled tubes or conduits is that the inner, outer, or both tubes must be held in their compressed or stretched state while other manufacturing steps are accomplished such as the connection of the tubes, the heat treatment thereof, and the cool down from the heat treatment.

SUMMARY OF THE INVENTION

The present invention provides a method of prestressing tubular apparatus during a manufacturing sequence therefore. According to the invention, the inner and outer coaxial tubes are first joined to each other, and the joints as well as the remainder of the assembly are heat-treated as required with no prestress applied. After these steps, the assembly is placed in a cold metal working machine such as a drawbench, roll extrusion machine or tube reducer, and the diameter of the outer tube is reduced to thereby elongate the outer tube along at least a part of its length. Only a small amount of elongation is sufficient to stretch the inner tube to a desired prestress level.

According to the invention, prestressing is applied to the assembly in a convenient manner after all previous complex manufacturing steps are accomplished. Time-consuming and costly hold-ups in the manufacturing sequence according to the prior art are thus avoided.

Accordingly, another object of the invention is to provide a method of manufacturing a double-walled tube having prestressed inner and outer walls which comprises positioning the inner wall within the outer wall, connecting the inner wall to the outer wall, at, at least two spaced locations along the length of the inner and outer walls, and mechanically reducing the diameter of the outer wall so as to permanently elongate the outer wall whereby the inner wall is prestressed with respect to the outer wall.

A further object of the invention is to provide a method of prestressing a double wall tube having an inner wall positioned within an outer wall and connected to the outer wall at at least two spaced locations along the length thereof comprising, reducing the diameter of the outer wall to elongate the outer wall permanently so as to prestress the inner wall with respect to the outer wall.

For an understanding of the principles of the invention, reference is made to the following description of typical embodiments thereof as illustrated in the accompanying drawings.

BRIEF DESCRIPTION OF THE DRAWINGS

In the Drawings:

FIG. 1 is a side sectional view of a double walled tube to which prestressing is to be applied according to the invention;

FIG. 2 is a perspective view of a roll extrusion machine that can be used for reducing the diameter of the outer wall according to the invention;

FIG. 3 is a view similar to FIG. 2 showing the double walled tube within the tube extrusion machine;

FIG. 4 is a perspective view showing the use of a drawbench for elongating the outer tube; and FIG. 5 is a perspective view of a different roller arrangement for reducing the diameter of the outer tube.

DESCRIPTION OF THE PREFERRED EMBODIMENTS

Referring to the drawings in particular, the invention comprises a method of manufacturing and prestressing a tubular apparatus generally designated 10 in FIG. 1. The tubular apparatus comprises an outer wall or tube portion 12 and an inner wall or tube portion 14 which are coaxially disposed with respect to each other and fixed to each other by welded or otherwise interconnected joints 16 and 18, which are connected between the inner and outer tubes at spaced locations along the length thereof and preferably at their ends.

Inner tube 14 is adapted to convey high temperature fluid, such as steam. Double wall tube 10 can, for example, be a single string length of an insulated steam injection tube used for extracting oil from an oil well using steam.

According to the invention, after the inner and outer tube portions are connected to each other by joints 16, 18 afterwhich the assembly may be heat-treated or otherwise processed, and the diameter of the outer tube portion 12 is reduced. This simultaneously causes elongation of the outer tube portion 12. This permanent elongation establishes a prestress condition within the assembly whereby the inner tube receives a tensile prestress and the outer tube receives a compressive prestress.

As shown in FIGS. 2 and 3, diameter reduction can be accomplished by extrusion rollers 20 and 22 which have concave surfaces and are positioned on perpendicularly extending axes so that the entire outer surface of outer tube portion 12 is compressed evenly.

Alternatively, as shown in FIG. 4, the outer diameter can be reduced by elongating the outer tube portion 12 in a drawbench having jaws or grips 24 that receive a force to pull the tube portion 12 through the die portion 26 in the direction indicated by the arrows.

A still further way of elongating outer tube portion 12 is by rolling it in a direction indicated by the arrow in FIG. 5 between rollers 28 which are on axes extending at an angle to the major axis of tube 12 so that with rotation of the tube, the tube is also moved axially between rollers 28. Other satisfactory methods for reducing the diameter such as roll sinking and swaging are meant to come within the scope of the present invention.

It is noted that diameter reduction should take place only between the joints 16, 18 rather than over the joints.

It is also possible to increase the diameter of the inner tube 14 for shortening it for prestressing purposes.

It is important that sufficient stress be applied radially to the outer tube when the outer tube is to be elongated, to go past the yield point of the material of the outer tube. This may require a large diameter reduction over only a small portion of the tube. In other words, if insufficient stress is applied to the outer tube during diameter reduction, the tube will simply bounce back to approximately its original shape. It also desirable to strain gage the inner tube so as to cease diameter reduction of the outer tube when the stress on the inner tube rises to a predetermined amount.

An advantage of the invention relates to the fact that although the tubes and connecting members may be treated prior to prestressing, it is difficult to heat treat the welds if the tubular apparatus is under stress. The stress would have to be maintained on the tubes during such heat treatment since the heat would otherwise cause the welds to have insufficient strength to hold. For this reason it is considered likely that there is a tendency in the industry not to heat treat the welds under the conventional process of connecting the tubes after prestressing them. In such a case the welds are more brittle, more damage prone and more corrosion prone.

Diameter reduction for the purposes of permanently elongating a tube, is discussed in *Theory Of Plasticity*, Hoffman and Sachs, McGraw Hill, pages 252 to 257 and *Mathematical Theory of Plasticity*, R. Hill, Oxford University Press, pages 269 to 272.

An example of the invention utilizes an outer tube which is swaged over a length of 100 inches from an original outer diameter of 4.5 inches to a final outer diameter of 4.4596 inches. During this swaging the wall thickness increases from 0.271 inches to 0.2726 inches. This provides an elongation of the tubular apparatus of 0.4 inches or from an original length of 40 feet to a final length of 40 feet 0.4 inches. The resulting prestress is 25 KSI on the inner tube and 12.58 KSI on the outer tube. The discrepancy in force is due to the larger area of the outer tube with respect to the inner tube.

The stress required to lengthen the inner tube does have a bearing on whether or not such stress is required to permanently elongate the outer tube. For example, at some level of the inner tube strength, the stress required to elongate the inner tube may be so great that the diameter reduction, instead of making the outer tube both thicker and longer as in this example, will instead just cause a thickness increase without any lengthening of the tube. The amount of diameter decrease of the outer tube thus must be selected carefully.

Concerning other features of the structure used in conjunction with the invention, the annular space between the inner and outer tubes may be advantageously insulated using fibrous or layered insulation, and/or evacuated to establish a thermal barrier. When the space is evacuated it is advantageous to provide the space with a getter material that absorbs gases that may migrate into the space during the life of the tubular apparatus. Such getter material is for example titanium and is advantageously provided around the inner tube when the inner tube conveys steam and is at an elevated temperature of from 400° to 700° F. The getter material is activated to improve its gas absorbing function. Gases which may migrate into the annular space include hydrogen formed by corrosion of the outer tube or outgassed gases from the inner tube such as nitrogen, carbon monoxide and oxygen.

While specific embodiments of the invention have been shown and described in detail to illustrate the application of the principles of the invention, it will be understood that the invention may be embodied otherwise without departing from such principles.

What is claimed is:

1. A method of prestressing a tubular apparatus having at least one inner metal tube positioned within and spaced from an outer metal tube comprising connecting the inner tube to the outer tube at at least two spaced locations along the length of the tubular apparatus with the walls thereof spaced from each other, and, while said tubes are connected, reducing the diameter of the outer tube so as to permanently elongate the outer tube while elastically stressing the inner tube whereby a tensile prestress is applied to the inner tube and a compressive prestress is applied to the outer tube and with the walls of the inner and outer tubes remaining spaced from each other.

2. A method of manufacturing a tubular apparatus having prestressed inner and outer metal tubes comprising:

positioning the inner tube within and spaced from the outer tube;

connecting the inner tube to the outer tube at at least two spaced locations along the length of the inner and outer tubes with the walls of the inner and outer tubes spaced from each other; and while said tubes are connected, mechanically reducing an outer diameter of the outer tube as to permanently elongate the outer tube while elastically stressing the inner tube in tension whereby the inner tube is prestressed in tension with respect to the outer tube and with the walls of the inner and outer tubes remaining spaced from each other.

3. A method according to claim 1 or 2, including reducing the diameter of the outer tube by cold working the outer wall using one of the group consisting of a drawbench, a roll extrusion machine, a swaging means, a roll sinking means, and a tube reducer.

4. A method according to claim 1, including reducing the diameter of the outer tube by applying stress in a radially inwardly direction to said outer tube to exceed the yield point of said outer tube to thereby permanently reduce the diameter of and elongate said outer tube while elastically stressing said inner tube whereby a tensile prestress is applied to the inner tube and a compressive prestress is applied to the outer tube.

5. A method of manufacturing a prestressed tubular apparatus having at least one inner metal tube positioned within and spaced from an outer metal tube comprising connecting the inner tube to the outer tube at at least two locations spaced along the length of the tubes with the walls of the inner and outer tubes spaced from each other, and, while said tubes are connected, permanently elongating one of said tubes while elastically stressing the other of said tubes whereby a compressive prestress is applied to said one tube and a tensile prestress is applied to said other tube and with the walls of the inner and outer tubes remaining spaced from each other.

* * * * *